United States Patent [19]

Mölls et al.

[11] Patent Number: 4,527,746

[45] Date of Patent: Jul. 9, 1985

[54] PROCESS FOR PREPARING GRANULES OF WATER-INSOLUBLE SOLIDS

[75] Inventors: Hans-Heinz Mölls, Leverkusen; Vaclav Kaspar, Cologne; Bernhard Vosteen, Cologne; Georg Dehmel, Cologne; Reinhold Hörnle, Cologne; Karlheinz Wolf, Leverkusen, all of Fed. Rep. of Germany

[73] Assignee: Bayer Aktiengesellschaft, Leverkusen, Fed. Rep. of Germany

[21] Appl. No.: 477,806

[22] Filed: Mar. 22, 1983

[30] Foreign Application Priority Data

Apr. 7, 1982 [DE] Fed. Rep. of Germany ....... 3212965

[51] Int. Cl.$^3$ .............................................. B02C 19/12
[52] U.S. Cl. ......................................... 241/23; 241/30
[58] Field of Search .................. 241/60, 3, 18, 23, 17, 241/27, 30, 65

[56] References Cited

U.S. PATENT DOCUMENTS

| | | |
|---|---|---|
| 2,195,754 | 4/1940 | Robson et al. .......................... 241/3 |
| 2,438,450 | 3/1948 | Nelson . |
| 2,494,101 | 1/1950 | Miller ................................. 241/3 X |
| 3,401,654 | 9/1968 | Reichert . |
| 3,942,970 | 3/1976 | O'Donnell . |
| 4,013,232 | 3/1977 | Broughton ............................. 241/3 |
| 4,057,392 | 11/1977 | O'Donnell . |

FOREIGN PATENT DOCUMENTS

| | | |
|---|---|---|
| 562707 | 11/1932 | Fed. Rep. of Germany . |
| 2946904 | 11/1979 | Fed. Rep. of Germany . |
| 2272044 | 5/1975 | France . |

OTHER PUBLICATIONS

Chem. Ing. Techn., vol. 31, p. 259, 1–1959.

Primary Examiner—Mark Rosenbaum
Attorney, Agent, or Firm—Sprung Horn Kramer & Woods

[57] ABSTRACT

Process for preparing granules of water-insoluble solids, characterized in that a non-thixotropic press or filter cake of the solid is comminuted by cutting and the product obtained is dried while in rolling motion in a dryer for pourable solids.

2 Claims, No Drawings

PROCESS FOR PREPARING GRANULES OF WATER-INSOLUBLE SOLIDS

The invention relates to a process for preparing granules of water-insoluble solids, in particular water-insoluble dyestuffs or pigments.

Water-insoluble dyestuffs and pigments are predominantly marketed in substantially anhydrous form for use in non-aqueous media such as solvents, film-forming materials, plastic moulding materials or plastics or for colouring smoke. Since most of these colorants, for example those of the particularly important azo type, are prepared in an aqueous medium, they must be isolated from the reaction mixture by mechanical pre-dewatering, for example filtering, pressing and the like, and, if necessary, purified by washing out by-products. These non-freeflowing pigment/water mixtures are then dried.

Conventional drying in layers, for example on trays, drums and the like, followed by dry milling produces powders which are very voluminous (bulk volumes up to 12 ccm/g) and are very highly dusting. Even colorants of this type which have been dried, for example, by circulating in a tumble dryer are very highly dusting.

Spray-drying these press cakes in a two-material nozzle using a process which is described in Chem. Ing. Techn. 31, page 259, 1959, and in which a hollow extrudate obtained from the unpretreated, non-freeflowing press cake is atomised by means of centrally supplied compressed air produces in similar fashion, like other spraying methods, for example those which use a high-speed disc, voluminous and highly dusting products. Granules sprayed by means of the pressure nozzle also have a high bulk volume.

All spray-dryer processes have the disadvantage that the dispersions must be highly diluted before spraying, thereby incurring high drying costs.

A further process consists in utilising the non-freeflowing, plastic state of the aqueous press cake as obtained on a filter press, when it contains 15-30% by volume of solids. In this process, the press cake in its original state is converted into granular size by means of a device which extrudes it as granules in the shape of relatively large mouldings, and is dried, ideally with this shape being retained, followed on occasion by a subsequent step in which the dried mouldings are carefully divided.

This process has the disadvantage that it is only possible to obtain coarse granules, namely greater than a particle size of 2 mm, which, due to the long indepth drying time, causes the texture of the granular material to harshen.

At the same time these granules are known from experience to be unstable, that is they disintegrate readily, and the sharp edges of individual granular particles rub against one another, thereby quickly producing a considerable dust fraction.

A process has now been found for preparing low-dust and freeflowing granules of water-insoluble solids from non-freeflowing, plastic, aqueous press cakes, which is free of the disadvantages of known processes, and produces granules having remarkably favourable properties in respect of bulk volume, flow, stability, dusting and texture.

The new process for preparing granules of waterinsoluble solids is characterised in that a non-thixotropic press or filter cake of the solid is comminuted by cutting and the product obtained is dried while in rolling motion in a dryer for pourable solids.

The process according to the invention preferably uses press or filter cakes which have a 30-90% by weight solids content.

The press or filter cake is preferably produced on a membrane high-pressure filter press, preferably under a pressure of about 12 to about 40 bar.

The new process is particularly suitable for granulating water-insoluble dyestuffs, and pigments. The colorants which can be processed according to the invention can belong to a very wide variety of chemical categories. Suitable examples are inorganic pigments, organic pigments and carbon black. Examples which may be mentioned of organic pigments are azo pigments, phthalocyanine pigments, polycyclic pigments of the perylene, quinacridone, anthraquinone and dioxazine series, triphenylmethane pigments and other pigments, such as, for example, metal complexes and coloured lakes. The new process is also particularly suitable for granulating dyestuffs which are soluble in organic solvents and plastics, dyestuffs for colouring smoke, and sublimable disperse dyestuffs.

The process is further particularly suitable for granulating pharmaceutical active compounds, drugs and agrochemicals, in particular pesticides, such as insecticides, herbicides, acaricides, dressings, fungicides, molluscacides and nematicides.

The press or filter cake is preferably comminuted by dicing in a suitable dicing apparatus, in particular a frictional dicer. This is a piece of size-reduction equipment for dicing cuttable material, in which a rotating driver continually supplies the material to a fixed dicing cylinder for processing. Appropriate machines are commercially available (made by, for example, Alexanderwerk Aktiengesellschaft, Remscheid, Germany).

The moist granules obtained by cutting, in particular dicing, have a particle size of about 0.5 to about 15 mm, preferably 1-3 mm.

The moist granular material is dried while in rolling motion in a dryer for pourable solids, in particular a contact dryer for pourable solids.

Dryers for pourable solids are preferably used in which the material to be dried only comes into contact with parts which are rigidly connected to one another. Particularly suitable are indirect-heat tube dryers which contain fitted spirals for conveying the product ("spiral rotary tube dryer").

A spiral rotary tube dryer contains a system comprising several tubes; each individual tube contains a sheet metal spiral which has been fitted to the shell and which co-rotates. Product is continuously shifted about in the flights of this spiral and slides to the right or to the left, and drops at the end of the tube into the next, adjacent, tube, and so on. The dryer can be heated with steam, pressurised water, heat-carrier oil or flue gases. Air or $N_2$ can be used to purge the system.

Dryers for pourable solids which are suitable for the process according to the invention have been disclosed, for example by German Patent Specification 562,707 and German Auslegeschrift 2,946,904.

The product is preferably dried down to a residual moisture content of about 0.1 to about 5% by weight, preferably less than 1% by weight.

The process according to the invention can be carried out not only discontinuously but also, preferably, continuously.

EXAMPLE 1

A Pigment Yellow 74 press cake (solids content=45% by weight) is diced in a frictional dicer (slot width about 3 mm). The resulting moist granules are then dried in an indirect-heat tube dryer which contains fitted spirals for conveying the product ("spiral rotary tube dryer"; effective tube length: about 6 m; internal tube diameter: 342 mm; total heating surface: about 50 $m^2$; specific evaporative performance: 6 kg of $H_2O/m^2$ at 50 pm). The temperature of the heating medium was 135° C., the degree of fillage was 33% by volume, and the performance was about 300 kg of dry substance/h. The dried granular material has a residual moisture content of 0.17% by weight, has good flow, and is low-dusting.

EXAMPLE 2

If conditions which are identical to Example 1 are used to dry, also at 135° C., a Pigment Orange 34 press cake which has an initial moisture content of 62%, freeflowing, low-dusting granules are obtained. The residual moisture content was 0.2%.

What we claim:

1. A process for preparing granules of water-insoluble solids said solids comprising a water-insoluble pigment which comprises comminuting a non-thixotropic press or filter cake of such solids by introducing said press or filter cake via a rotating driver to a dicing cylinder of a dicing apparatus and therein dicing said solids and drying the so diced solids in a dryer while subjecting the same to a rolling motion such that said solids only come in contact with parts of said dryer which are rigidly connected to one another.

2. A process for preparing granules of water-insoluble solids said solids comprising a water-insoluble dyestuff which comprises comminuting a non-thixotropic press or filter cake of such solids by introducing said press or filter cake via a rotating driver to a dicing cylinder of a dicing apparatus and therein dicing said solids and drying the so diced solids in a dryer while subjecting the same to a rolling motion such that said solids only come in contact with parts of said dryer which are rigidly connected to one another.

* * * * *